United States Patent
Palmaro et al.

(10) Patent No.: US 11,863,863 B2
(45) Date of Patent: Jan. 2, 2024

(54) SYSTEM AND METHOD FOR FRUSTUM CONTEXT AWARE DIGITAL ASSET SUGGESTIONS

(71) Applicant: Unity IPR ApS, Copenhagen (DK)

(72) Inventors: Gregory Lionel Xavier Jean Palmaro, San Francisco, CA (US); Charles Janusz Migos, Millbrae, CA (US); Gerald James William Orban, New Westminster (CA)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 17/383,189

(22) Filed: Jul. 22, 2021

(65) Prior Publication Data
US 2022/0030161 A1   Jan. 27, 2022

Related U.S. Application Data

(60) Provisional application No. 63/055,195, filed on Jul. 22, 2020.

(51) Int. Cl.
| | | |
|---|---|---|
| H04N 23/60 | (2023.01) | |
| G06T 7/70 | (2017.01) | |
| H04N 23/62 | (2023.01) | |
| H04N 23/69 | (2023.01) | |

(52) U.S. Cl.
CPC ............ H04N 23/64 (2023.01); G06T 7/70 (2017.01); H04N 23/62 (2023.01); H04N 23/69 (2023.01)

(58) Field of Classification Search
CPC ........... H04N 5/23222; H04N 5/23216; H04N 5/23296; H04N 5/232; G06T 7/70

USPC .................................................. 348/333.02
See application file for complete search history.

(56) References Cited

U.S. PATENT DOCUMENTS

| | | | | |
|---|---|---|---|---|
| 6,219,045 | B1 * | 4/2001 | Leahy ................... | H04L 67/10 |
| | | | | 709/204 |
| 8,854,501 | B2 * | 10/2014 | Nagata .............. | H04N 5/23229 |
| | | | | 348/229.1 |
| 9,043,413 | B2 * | 5/2015 | Kraft ................... | G06F 16/3344 |
| | | | | 709/206 |
| 9,270,899 | B1 * | 2/2016 | Ivanchenko ............ | G06T 7/194 |
| 9,639,987 | B2 * | 5/2017 | Fahey .................. | H04N 5/2224 |
| 10,115,149 | B1 * | 10/2018 | Deem .................. | G06T 19/006 |
| 10,868,956 | B2 * | 12/2020 | Vinjam .............. | H04N 5/23218 |
| 2002/0054129 | A1 * | 5/2002 | Heron ..................... | G06T 19/00 |
| | | | | 715/782 |
| 2010/0188503 | A1 * | 7/2010 | Tsai .................. | H04N 21/42202 |
| | | | | 348/142 |
| 2010/0268457 | A1 * | 10/2010 | McCrae .................. | G06T 15/30 |
| | | | | 701/408 |
| 2013/0095924 | A1 * | 4/2013 | Geisner ................ | G02B 27/017 |
| | | | | 463/32 |

(Continued)

*Primary Examiner* — Usman A Khan
(74) *Attorney, Agent, or Firm* — Schwegman Lundberg & Woessner, P.A.

(57) ABSTRACT

A method of determining a suggested digital object to place into a 3D environment is disclosed. Scene data within a frustum volume of a camera within a 3D environment is determined. The scene data includes a set of digital objects that are located within the frustum volume. A set of traits is determined based on the scene data. At least one suggested digital object is suggested for placing into the 3D environment based on a correlation between the suggested digital object and the set of traits.

20 Claims, 13 Drawing Sheets

(56) References Cited

U.S. PATENT DOCUMENTS

2014/0129354 A1* 5/2014 Soon-Shiong ........ G06F 3/0484
   705/16
2016/0364901 A1* 12/2016 Balci .................... G06T 15/005

* cited by examiner

SYSTEM AND METHOD FOR FRUSTUM CONTEXT AWARE DIGITAL ASSET SUGGESTIONS

CROSS-REFERENCE TO RELATED APPLICATIONS

This application claims the benefit of U.S. Provisional Application No. 63/055,195, filed Jul. 22, 2020, which is incorporated by reference herein in its entirety.

TECHNICAL FIELD

The subject matter disclosed herein generally relates to the technical field of computer systems, and in one specific example, to computer systems and methods for generating digital asset suggestions based on a camera view.

BACKGROUND OF THE INVENTION

Adding assets to a scene using traditional techniques is problematic as programmers often have the tedious task of choosing between an infinite number of assets to match the scene. Every asset has to be placed, scaled and oriented one by one to fill the scene. Importantly, the lists of assets are often provided without taking into consideration the context of the scene. This is an inefficient way to edit a scene as programmers have to waste time disregarding irrelevant assets that do not match the scene.

BRIEF DESCRIPTION OF THE DRAWINGS

Further features and advantages of example embodiments of the present invention will become apparent from the following detailed description, taken in combination with the appended drawings, in which.

It will be noted that throughout the appended drawings, like features are identified by like reference numerals.

DETAILED DESCRIPTION

Figure 1:
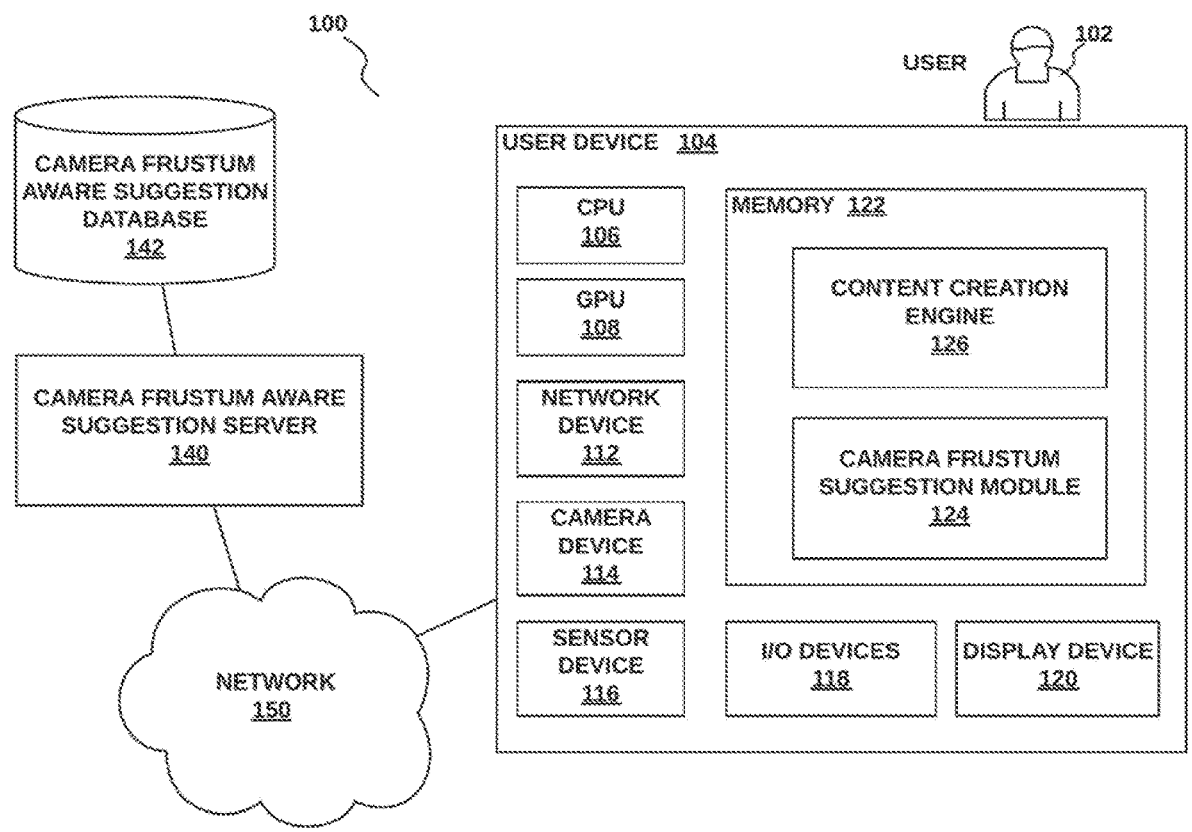
FIG. 1 is a schematic illustrating a camera frustum suggestion system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'digital object', used throughout the description herein is understood to include any object of digital nature or digital structure or a digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

The term 'build' and 'game build' used throughout the description herein should be understood to include a compiled binary code of a game which can be executed on a device, and which, when executed can provide a playable version of the game (e.g., playable by a human or by an artificial intelligence agent).

The terms 'client' and 'application client' used throughout the description herein are understood to include a software client or software application that can access data and services on a server, including accessing over a network.

Throughout the description herein, the term 'mixed reality' (MR) should be understood to include all combined environments in the spectrum between reality and virtual reality (VR) including virtual reality, augmented reality (AR) and augmented virtuality.

A method of determining a suggested digital object to place into a 3D environment is disclosed. Scene data within a frustum volume of a camera within a 3D environment is determined. The scene data includes a set of digital objects that are located within the frustum volume. A set of traits is determined based on the scene data. At least one suggested digital object is suggested for placing into the 3D environment based on a correlation between the suggested digital object and the set of traits.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

The systems and methods described herein include one or more components or operations that are non-routine or unconventional individually or when combined with one or more additional components or operations, because, for example, they provide a number of valuable benefits to content creators that were not available in prior art systems. For example, the systems and methods described herein provide suggestions of digital objects according to a 3D space view (e.g., frustum view) of a camera within an environment based on detected content within the frustum and a detected scale of the contents within the frustum (e.g., the detected scale may be determined by comparing a size of the contents with a size of the frustum volume). The suggested digital objects may have a determined association with the detected content and the detected scale, wherein the determined association may be based on traits (e.g., as described below). For example, based on a camera frustum containing a scene view (e.g., a view of the environment) that includes a waterfall (e.g., based on the camera pointing towards the waterfall), then the systems and methods described herein may suggest digital objects related to a concept of a waterfall, which may include rocks, bridges, dams, and the like. Furthermore, based on a detected zooming of the camera towards a river basin at the base of the waterfall, the systems and methods described herein may suggest additional digital objects related to a scale of the zoomed camera frustum, e.g., including fish, boats, aquatic plants, and the like. Additionally, based on a zooming out of the camera frustum, the systems and methods described herein may suggest larger digital objects related to zoomed out scale of the camera, the larger digital objects including rivers, forests, mountains, and the like. The suggestions are linked to a context (e.g., the detected contents and scale) of the camera frustum view and may help a user (e.g., content creator) to create complex layouts of a scene (e.g., a 3D scene within an environment) in a reduced amount of time when compared to existing systems and methods.

Turning now to the drawings, systems and methods, including non-routine or unconventional components or operations, or combinations of such components or operations, for a camera frustum aware suggestion bar in accordance with embodiments of the invention are illustrated. In accordance with an embodiment, FIG. 1 is a diagram of an example camera frustum aware suggestion system 100 and associated devices configured to provide camera frustum aware suggestion bar functionality (e.g., as described below with respect to FIG. 2A, FIG. 2B, FIG. 2C, FIG. 3, FIG. 4, FIG. 5, FIG. 6A, FIG. 6B, FIG. 7, and FIG. 8). In the example embodiment, the camera frustum aware suggestion system 100 includes a user device 104 (e.g., operated by a user 102), a camera frustum aware suggestion server 140, and a camera frustum aware suggestion database 142 coupled in networked communication with the user device 104 via a network 150 (e.g., a cellular network, a Wi-Fi network, the Internet, and so forth). In some embodiments, the user device 104 is a mobile computing device, such as a smartphone, a tablet computer, a laptop computer, a head mounted virtual reality (VR) device or a head mounted augmented reality (AR) device. In other embodiments, the user device 104 is a computing device such as a desktop computer.

In the example embodiment, the user device 104 includes one or more central processing units (CPUs) 106 and graphics processing units (GPUs) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks or operations, including one or more non-routine tasks or operations or one or more combinations of tasks and operations, as described herein (e.g., in reference to FIG. 2A, FIG. 2B, FIG. 2C, FIG. 3, FIG. 4, FIG. 5, FIG. 6A, FIG. 6B, FIG. 7, and FIG. 8). The user device 104 also includes one or more networking devices 112 (e.g., wired or wireless network adapters) for communicating across the network 150. The user device 104 may further include one or more camera devices 114 which may be configured to capture digital video of the real world near the user device 104 during operation. The user device 104 may also include one or more sensors 116, such as a global positioning system (GPS) receiver (e.g., for determining a GPS location of the user device 104), biometric sensors (e.g., for capturing biometric data of the user 102), motion or position sensors (e.g., for capturing position data of the user 102, other objects, and the user device 104), or an audio microphone (e.g., for capturing sound data). Some sensors 116 may be external to the user device 104, and may be configured to wirelessly communicate with the user device 104 (e.g., such as used in the Microsoft Kinect®, Vive Tracker™, MIT's Lidar sensor, or MIT's wireless emotion detector).

The user device 104 may also include one or more input devices 118. The input device 118 is any type of input unit such as a mouse, a keyboard, a keypad, pointing device, a touchscreen, a microphone, a camera, a hand-held device (e.g., hand motion tracking device) and the like, for inputting information in the form of a data signal readable by the processing device 106.

The user device 104 further includes one or more display devices 120, such as a touchscreen of a tablet or smartphone, or lenses or visor of a VR or AR HMD, which may be configured to display virtual objects to the user 102, and which may be displayed in conjunction with a real world view (e.g., from the camera device 114). The display device 120 may be driven or controlled by one or more GPUs 108. The GPU 108 processes aspects of graphical output that assists in speeding up rendering of output through the display device 120. In accordance with an embodiment, an HMD may include a display device 120 that renders graphics (e.g., virtual objects) onto a visor attached to the HMD. As such, the visor acts as a "screen" or surface on which the output of the display device 120 appears, and through which the wearer 102 experiences virtual content.

The user device 104 also includes a memory 122 configured to store a client camera frustum aware suggestion module ("client module") 124. The memory 122 can be any type of memory device, such as random access memory, read only or rewritable memory, internal processor caches, and the like. In accordance with an embodiment, the camera frustum aware suggestion module 124 is configured to perform a series of tasks or operations, including one or more non-routine tasks or operations or one or more combinations of tasks and operations, as described herein in reference to FIG. 2A, FIG. 2B, FIG. 2C, FIG. 3, FIG. 4, FIG. 5, FIG. 6A, FIG. 6B, FIG. 7, and FIG. 8. The memory may also store a content creation module 126 (e.g., executed by the CPU 106 or GPU 108) that communicates with the display device 120 and also with other hardware such as the input/output device(s) 118 to present a 3D environment (e.g., a video game environment) or a 3D digital content creation environment to the user 102. The content creation module 126 may include one or more modules that provide one or more of the following: simulation of a virtual environment and digital objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment) via the display device 120. In accordance with an embodiment, the simulation and rendering of the virtual environment may be de-coupled, each being performed independently and concurrently, such that the rendering always uses a recent state of the virtual environment and current settings of the virtual environment to generate a visual representation at an interactive frame rate and, independently thereof, the simulation step updates the state of at least some of the digital objects (e.g., at another rate).

In accordance with an embodiment, the camera frustum aware suggestion module 124 may be separate from the content creation module 126 as shown in FIG. 1. In other embodiments, though not shown in FIG. 1, the camera frustum aware suggestion module 124 may be implemented within the content creation module 126.

Furthermore, the camera frustum aware suggestion system 100 may include a server 140 which includes a memory (not shown) storing a camera frustum aware suggestion server module ("server module"). During operation, the camera frustum aware suggestion module 124 and the camera frustum aware suggestion server module perform the various camera frustum aware suggestion system functionalities described herein as described herein in reference to FIG. 2A, FIG. 2B, FIG. 2C, FIG. 3, FIG. 4, FIG. 5, FIG. 6A, FIG. 6B, FIG. 7, and FIG. 8. More specifically, in some embodiments, some functionality may be implemented within the client module 124 and other functionality may be implemented within the server module (for example, in some embodiments, operation 208 may be performed in the server module). In accordance with an embodiment, the camera frustum aware suggestion module server 140 may communicate with the camera frustum aware suggestion database 142 as described herein in reference to FIG. 2A, FIG. 2B, FIG. 2C, FIG. 3, FIG. 4, FIG. 5, FIG. 6A, FIG. 6B, FIG. 7, and FIG. 8.

In an example embodiment, a user 102 (e.g., a wearer of an HMD, or someone holding a smartphone, tablet, or other MR-capable device) experiences an MR environment as presented by the camera frustum aware suggestion module 124 and content creation module 126 via the user device 104. The MR environment may include a view of the real world (e.g., immediate surroundings of the user device 104) along with displayed virtual content provided by the camera frustum aware suggestion system 100. For example, the camera frustum suggestion module 124, executing on the user device 104 (e.g., an HMD), may be configured to capture data from the camera device 114 or sensors 116 to generate suggestions according to the methods described with respect to FIG. 2A, FIG. 2B, FIG. 2C and FIG. 5. In the example embodiment, the camera device 114 and sensors 116 capture data from the surrounding environment, such as video, audio, depth information, GPS location, and so forth which may be used in the following: as input in operation 202 of the method 200 described in FIG. 2A; as input in operation 242 of the method 240 described with respect to FIG. 2C; and which may be used to determine scene data according to operation 204 of the method 200 described in FIG. 2A. In addition, the module 124 may be configured to analyze the captured data directly, or analyze a processed version of the captured data generated externally (e.g., a real-time list of detected and identified objects, object shape data, depth maps, and the like).

Figure 2A:
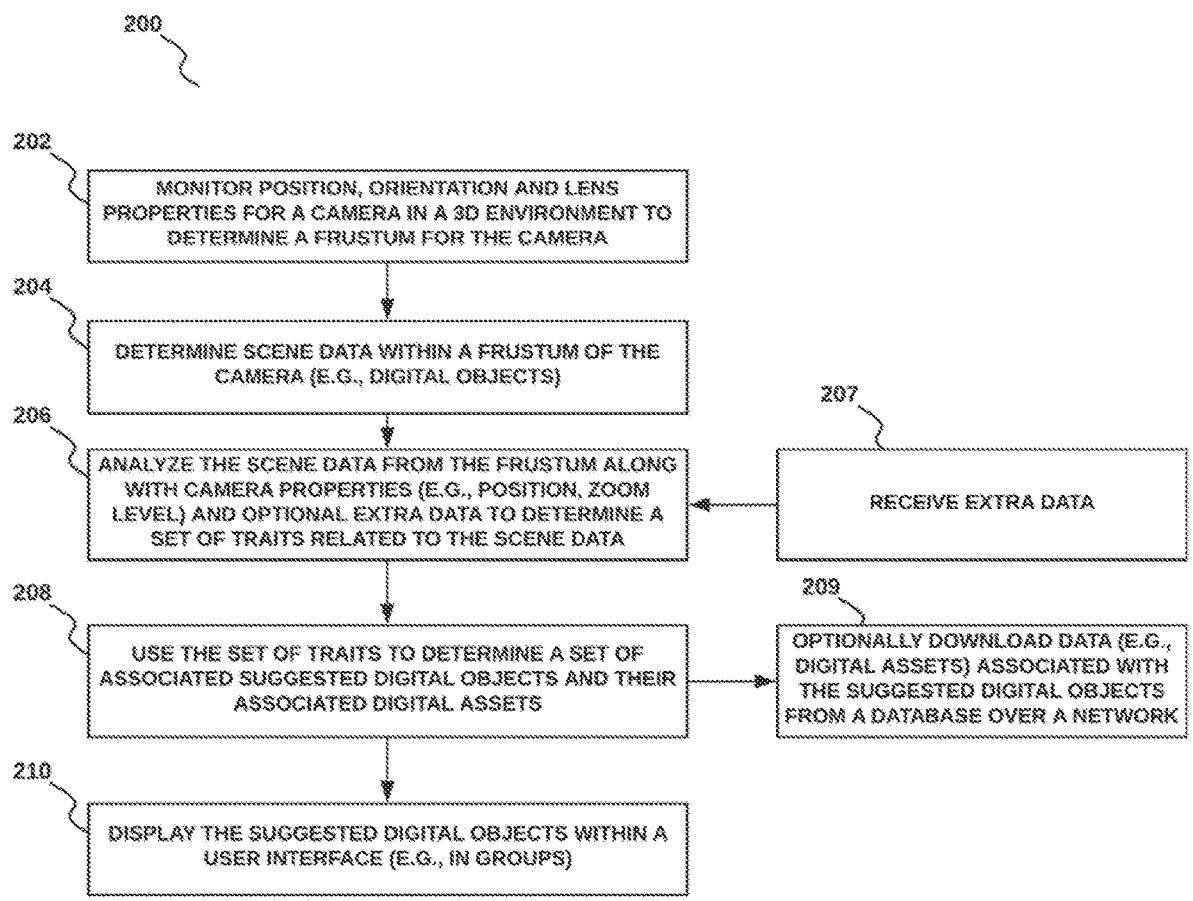
FIG. 2A is a schematic illustrating a method for generating digital object suggestions based on contents in a camera frustum using a camera frustum suggestion system, in accordance with one embodiment.

In accordance with an embodiment, FIG. 2A illustrates a method 200 for generating digital object suggestions based on contents in a camera frustum. In accordance with an embodiment, the method 200 may be performed within or in conjunction with a content creation system, method, application, module or the like; for example, the method 200 may be used in conjunction with the camera frustum aware suggestion system 100 as described with respect to FIG. 1. In accordance with an embodiment, an environment is provided by a content creation module 126. The environment and camera frustum are described in further detail below with respect to FIG. 3, FIG. 4, FIG. 6A, FIG. 6B, FIG. 7 and FIG. 8. In accordance with an embodiment, at operation 202 of the method 200, the camera frustum suggestion module 124 monitors a camera position, an orientation and lens properties for a camera in a 3D environment. The lens properties may include data describing an optical zoom level, aperture, f-value, and the like. As part of operation 202, one or more of the camera position, orientation, or lens properties are used to determine a frustum (e.g., a frustum view or frustum volume) for the camera within the environment. The frustum for the camera includes a volume of space within the environment representing a view for the camera. Digital objects within the environment that occupy space in the frustum volume are included when rendering a view for the camera. In accordance with an embodiment, the camera position, orientation and lens properties may be received (e.g., received by the content creation module 126) from a user interface, wherein the user interface receives input from the user 102.

In accordance with an embodiment, at operation 204 of the method 200, the camera frustum suggestion module 124 determines scene data with the frustum of the camera determined in operation 202. The scene data may include a plurality of digital objects that are located (either fully or partially) within the frustum volume within the environment. The digital objects may include characters, backgrounds, landscapes, stationary objects, animated objects, and more. In accordance with an embodiment, operation 204 may involve using culling techniques to ignore (e.g., filter out) digital objects that are not within the frustum.

In accordance with an embodiment, at operation 206 of the method, the camera frustum suggestion module 124 determines a set of traits associated with the scene data obtained during operation 204. The determination of the set of traits may include analyzing one or more of the following: the scene data within the frustum obtained from operation 204, the camera properties obtained from operation 202, and extra data. The extra data may be received during operation 207 of the method 200 and may be generated as described below with respect to operation 222 of method 220 (as described with respect to FIG. 2B), and the extra data may also be generated during operation 504 of the method 500 described with respect to FIG. 5. In accordance with an embodiment, the extra data may include text.

In accordance with an embodiment, a trait may include a word or combination of words which can be associated with a concept which can be used to derive context. A trait may be associated with semantic meaning (e.g., semantic tags). A trait associated with a concept may also be associated with other traits related to the concept. For example, a 'bedroom' trait which is associated with a semantic meaning of a bedroom may be linked to objects and traits related to bedrooms, including objects such as 'beds', 'closets', 'dressers', 'pillows', and the like as well as traits such as 'beds', 'closets', 'dressers', 'pillows', 'sleep', 'home', 'night', and the like. In accordance with an embodiment, and as part of operation 206 to determine the traits, a camera frustum aware suggestion module 124 may communicate with a database (e.g., a camera frustum aware suggestion module database 142, or the like) that includes data related to traits (e.g., the data including semantic information), and may also include data describing digital objects which may be related with the traits. In accordance with an embodiment, data within the database 142 may be used by the camera frustum aware suggestion module 124 to generate suggestions for digital objects as described with respect to FIG. 2A, FIG. 2B, FIG. 2C, and FIG. 5. In accordance with an embodiment, and as further described below as part of operation 208 and operation 209, the camera frustum aware suggestion module 124 may query the database 142 for digital objects related to traits; for example, based on a camera frustum aware suggestion module having a frustum that includes one or more objects that are associated with bedroom traits, the camera frustum aware suggestion module may query the database 142 for digital objects that are associated with a bedroom.

In accordance with an embodiment, a digital object within an environment may inherit traits from additional digital objects within the environment. The inheritance of traits may be performed by the camera frustum suggestion module 124 based on proximity of the digital object and the additional digital objects, placement hierarchy of the digital object and the additional digital objects (e.g., if the digital object is placed within an additional object of the additional objects), and the like). For example, a bedroom digital object may be placed (e.g., by a user 102 via a user interface) within a cabin digital object, or a townhome digital object, or a mansion digital object and may inherit traits associated with each. The inherited traits may represent, for example, different aspects of style and scale associated with the additional digital objects.

In accordance with an embodiment, at operation 208 of the method 200, the camera frustum suggestion module 124 uses the set of traits determined in operation 206 to determine a set of suggested digital objects. The determining of the set of suggested digital objects may include analyzing the traits to determine associations between the traits and a set of digital objects (e.g., a set of digital objects from within the camera frustum aware suggestions database 142). In accordance with an embodiment, the determining of associations may include determining associations between semantic information related to the traits and to the set of digital objects (e.g., linking traits and digital objects with similar semantic information). In accordance with an embodiment, the analyzing of the traits to determine associations may be performed by an external system (e.g., with results of the analyzing provided to the camera frustum aware suggestion module 124). In accordance with an embodiment, as part of operation 208, the camera frustum suggestion module 124 determines digital assets associated with the suggested digital objects, wherein the digital assets include data that describes the suggested digital objects. In accordance with an embodiment, at operation 209 of the method 200, the camera frustum suggestion module 124 may download the determined digital assets from a database 142 over a network 150.

In accordance with an embodiment, at operation 210 of the method 200, the camera frustum suggestion module 124 displays the suggested digital objects within a graphical user interface. In accordance with an embodiment, the suggested digital objects are displayed in groups, wherein a group may include a set of suggested digital objects which have a common association with each other (e.g., as determined via a comparison of traits associated with the suggested digital objects, the comparison determining a similarity above a threshold). The displaying is described in more detail with respect to FIG. 4, FIG. 6A, FIG. 6B, FIG. 7 and FIG. 8.

Figure 2B:
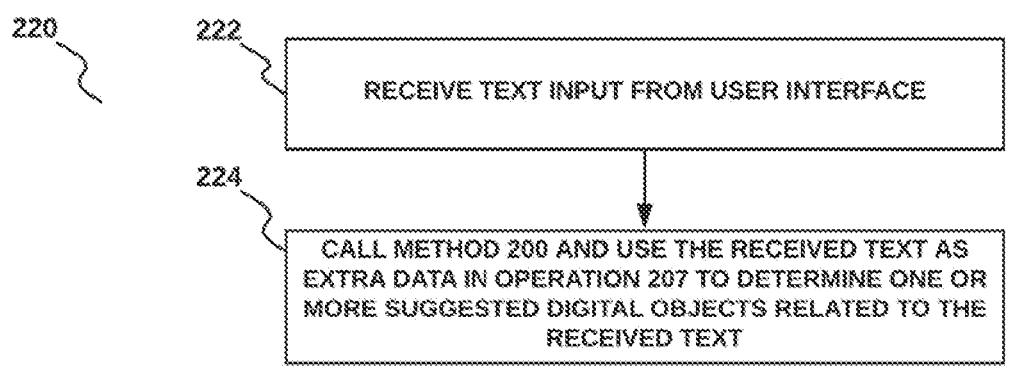
FIG. 2B is a schematic illustrating a method for generating digital object suggestions based on contents in a camera frustum and received text using a camera frustum suggestion system, in accordance with one embodiment.

In accordance with an embodiment, FIG. 2B is an illustration of a method 220 for determining suggested digital objects from a text input. In accordance with an embodiment, at operation 222 of the method 220, the camera frustum suggestion module 124 receives a text input from a graphical user interface. The text input may be generated by a user 102 interacting with the user device 104 and inputting text via an input device 108 such as a keyboard, touchscreen or via voice recognition.

In accordance with an embodiment, at operation 224 of the method 220, the camera frustum suggestion module 124 executes the method 200 for generating digital object suggestions based on contents in a camera frustum and uses the text input from operation 222 as extra data in operation 207 and operation 206 of the method 200. In accordance with an embodiment, as part of operation 206, the text received from operation 224 may be analyzed using natural language processing (NLP) to extract out traits which may be combined with traits extracted from a camera frustum to determine suggestions in operation 208.

Figure 2C:
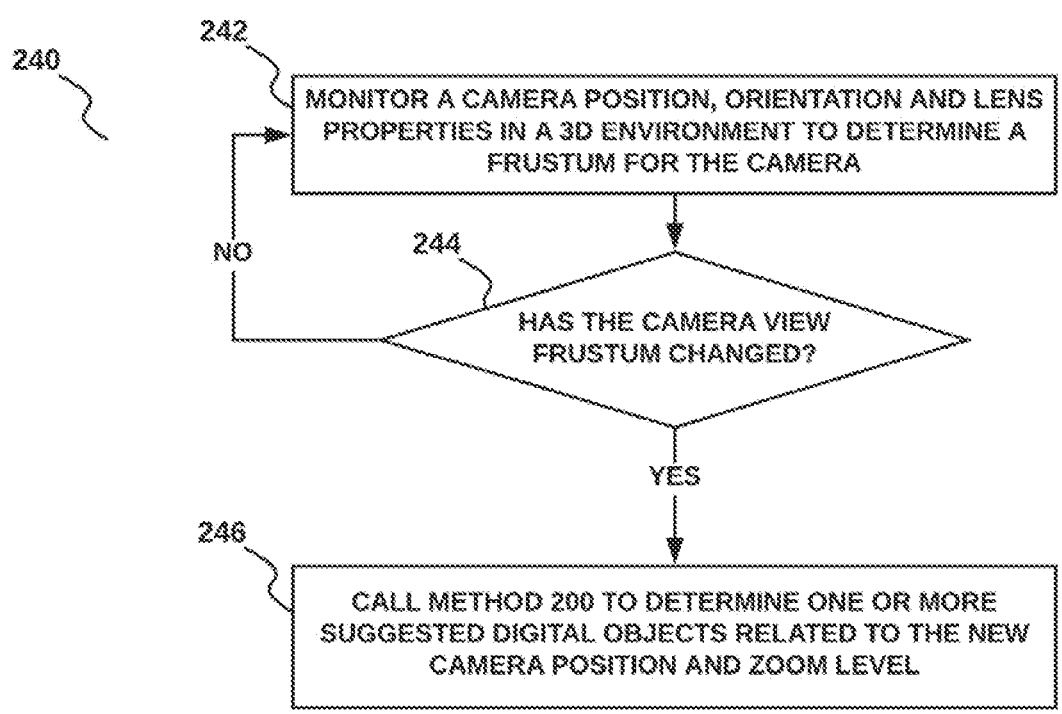
FIG. 2C is a schematic illustrating a method for generating digital object suggestions based on contents in a camera frustum and a camera movement using a camera frustum suggestion system, in accordance with one embodiment.

In accordance with an embodiment, FIG. 2C is an illustration of a method 240 for determining suggested digital objects based on a change in view frustum from a camera. In accordance with an embodiment, at operation 242 of the method 240, the camera frustum suggestion module 124 monitors the camera position, camera orientation and camera lens properties in a 3D environment over time. In accordance with an embodiment, as part of operation 242, the camera frustum suggestion module 124 determines if a camera view frustum from the camera has changed due to a change in the camera position, the camera orientation, and the camera lens properties. In accordance with an embodiment, at operation 246 of the method 240, based on the change being above a configurable threshold, the camera frustum suggestion module 124 executes the method 200 to determine and display one or more suggested digital objects related to the new camera view frustum within the environment. The method 240 may be used when a camera view of the environment is changed (e.g., by a user 102) beyond a predetermined amount such that it includes different scene data within its frustum view. This may occur when a camera is moved (e.g., position and orientation) and when camera properties are changed (e.g., zooming in and zooming out). For example, a change in frustum view may be associated with a change in the scene data therein which includes a change in number and type of digital objects, and a change in scale of the digital objects. The change in scale may be determined by comparing a size of the scene data (e.g., a size of digital objects within the scene data) with a size of the frustum volume.

Figure 3:
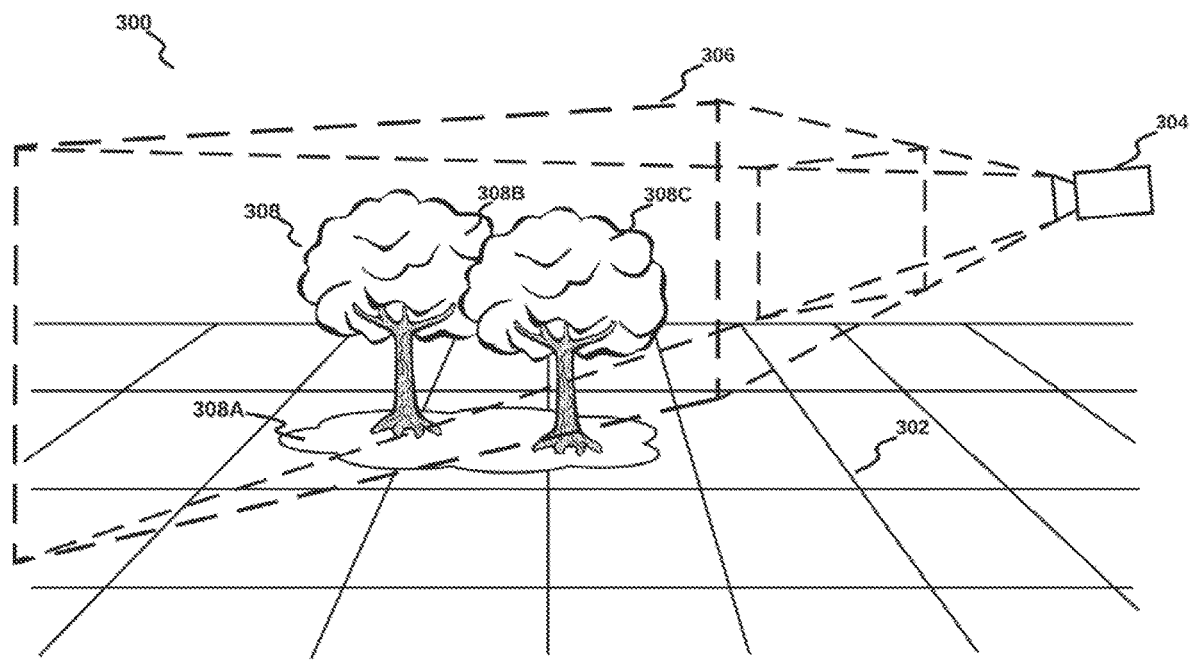
FIG. 3 is a schematic illustrating a virtual camera frustum within an environment for a camera frustum suggestion system, in accordance with one embodiment.

In accordance with an embodiment, FIG. 3 is an illustration of a simple 3D environment 300 that includes a ground 302 and a digital object of a small patch of land 308A and two trees (308B and 308C) referred to collectively as a tree patch 308. Also shown in FIG. 3 is a virtual camera 304 for capturing a view of the environment 300 via a frustum 306.

Figure 4:
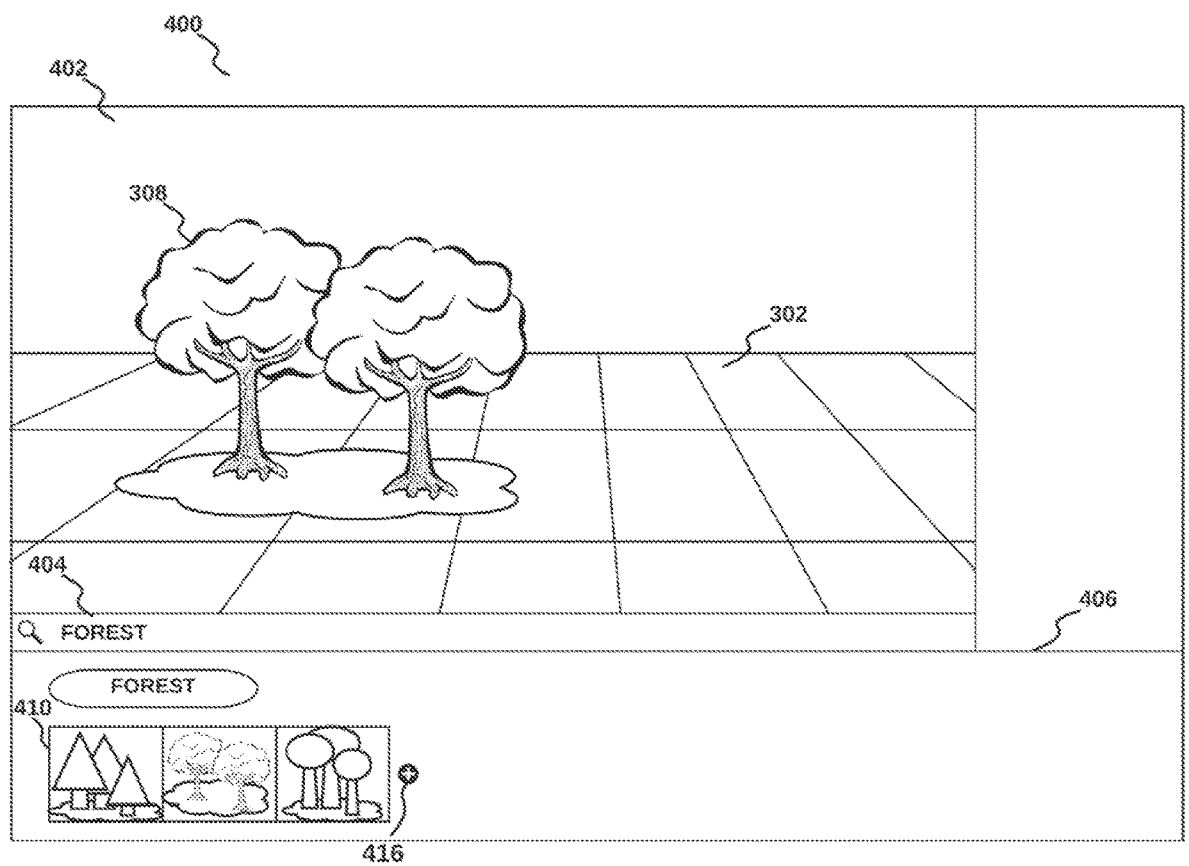
FIG. 4 is a schematic illustrating a graphical user interface displaying digital object suggestions based on contents in a camera frustum using a camera frustum suggestion system, in accordance with an embodiment.

In accordance with an embodiment, and shown in FIG. 4, is an illustration of a graphical user interface 400 for display on a display device 120, the graphical user interface comprising: a first display area including a view window 402 for displaying a rendered view of the frustum 306 described with respect to FIG. 3; a second display area that includes a search bar 404 text input; and a third display area including a suggestion window 406 for displaying digital object suggestions (e.g., as generated using the methods described in FIG. 2A, FIG. 2B, FIG. 2C, and FIG. 5). The graphical user interface 400 and all contents therein may be created by the content creation engine 126 in conjunction with the camera frustum suggestion module 124 as part of operation 210. In accordance with an embodiment, the rendered view being displayed within the view window 402 (e.g., graphical user interface window) which includes a rendering of the ground 302 and the tree patch 308. In accordance with an embodiment, the search bar 404 may be used to receive text input from the user as part of operation 222 in the method 220. As an example, and as shown in FIG. 4, the search bar 404 includes the word 'FOREST' (e.g., as entered by a user 102). In accordance with an embodiment, the suggestion window 406 may display suggestions generated by the camera frustum suggestion module 124 using the method 200 described with respect to FIG. 2A, the method 220 described with respect to FIG. 2B, and the method 240 described with respect to FIG. 2C. In accordance with an embodiment, suggestions may be displayed in groups as part of operation 210. In the example shown in FIG. 4, a first group 410 comprising 3 suggestions is shown in response to the text 'FOREST' input into the search bar 404. The 3 suggestions show three different styles of forests. The 3 suggestions in the first group 410 may be generated using the method 220 described with respect to FIG. 2B wherein the word 'FOREST' may be analyzed to determine traits associated with the word 'FOREST', and digital objects may be determined based on a commonality of the determined traits and additional traits determined for the digital objects.

Figure 5:
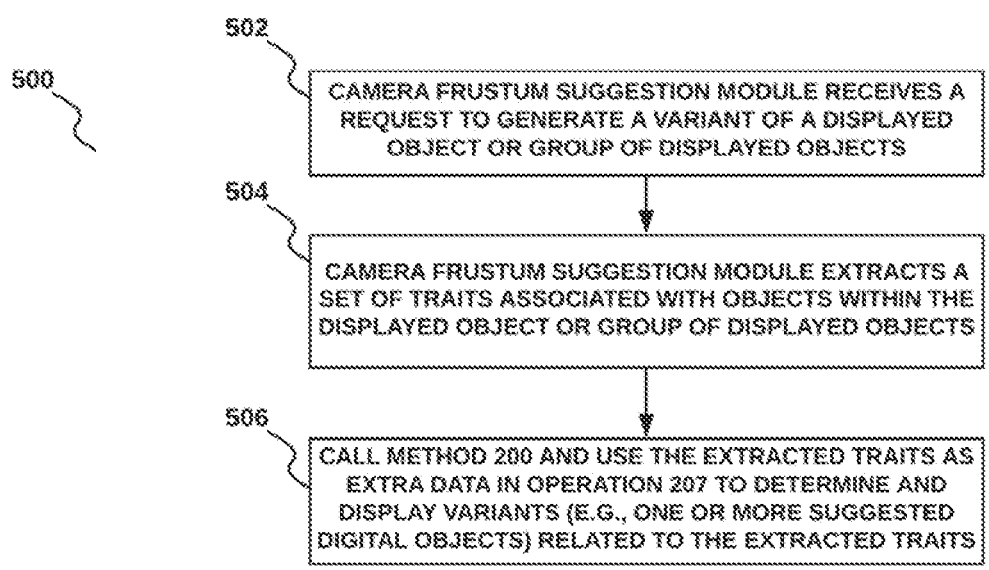
FIG. 5 is a schematic illustrating a method for generating variant digital object suggestions based on contents in a camera frustum using a camera frustum suggestion system, in accordance with one embodiment.

In accordance with an embodiment, and shown in FIG. 5 is a method 500 for generating variant suggestions of digital objects based on a previously determined and displayed group of suggestions within the graphical user interface 400 (e.g., within the suggestion window 406). The variant suggestions include suggestions of digital objects which are related (e.g., related via a commonality of traits) but include small differences when compared to the previously displayed group. An amount of difference may be determined by an amount of correlation of traits between the variant suggestions and the displayed group. The variants may include digital objects which have common traits (e.g., common semantic meaning) with a different visual style than the previously displayed group, different sizes than the previously displayed group, and may be presented in different ways than the displayed group (e.g., individual trees rather than a group of trees).

In accordance with an embodiment, at operation 502 of the method 500, the camera frustum suggestion module 124 receives a request to generate a variant of a displayed object or group of displayed objects (e.g., the first group 410 shown in FIG. 4). The request may be a request for a group of variants. In accordance with an embodiment, the request may be received via the graphical user interface 400. In accordance with an embodiment, and shown in FIG. 4 is an 'addition' element 416 in the graphical user interface 400 which is used to initiate a request for operation 502. The addition element 416 may be displayed in proximity to (e.g., next to) a suggested group 410 and which may be clicked or pressed (e.g., using graphical user interface methods) to initiate the request. In accordance with an embodiment, at operation 504 of the method 500, the camera frustum suggestion module 124 extracts a set of traits associated with objects within the displayed group 410 which is in proximity to the addition element 416. The extraction may use methods described in operation 206 of the method 200 shown in FIG. 2A. The extracted traits describe the objects within the group 410. In accordance with an embodiment, at operation 506 of the method 500, the camera frustum suggestion module 124 calls the method 200 and uses the extracted traits from operation 504 as extra data in operation 207 in order to determine and display variants related to the extracted traits.

Figure 6A:
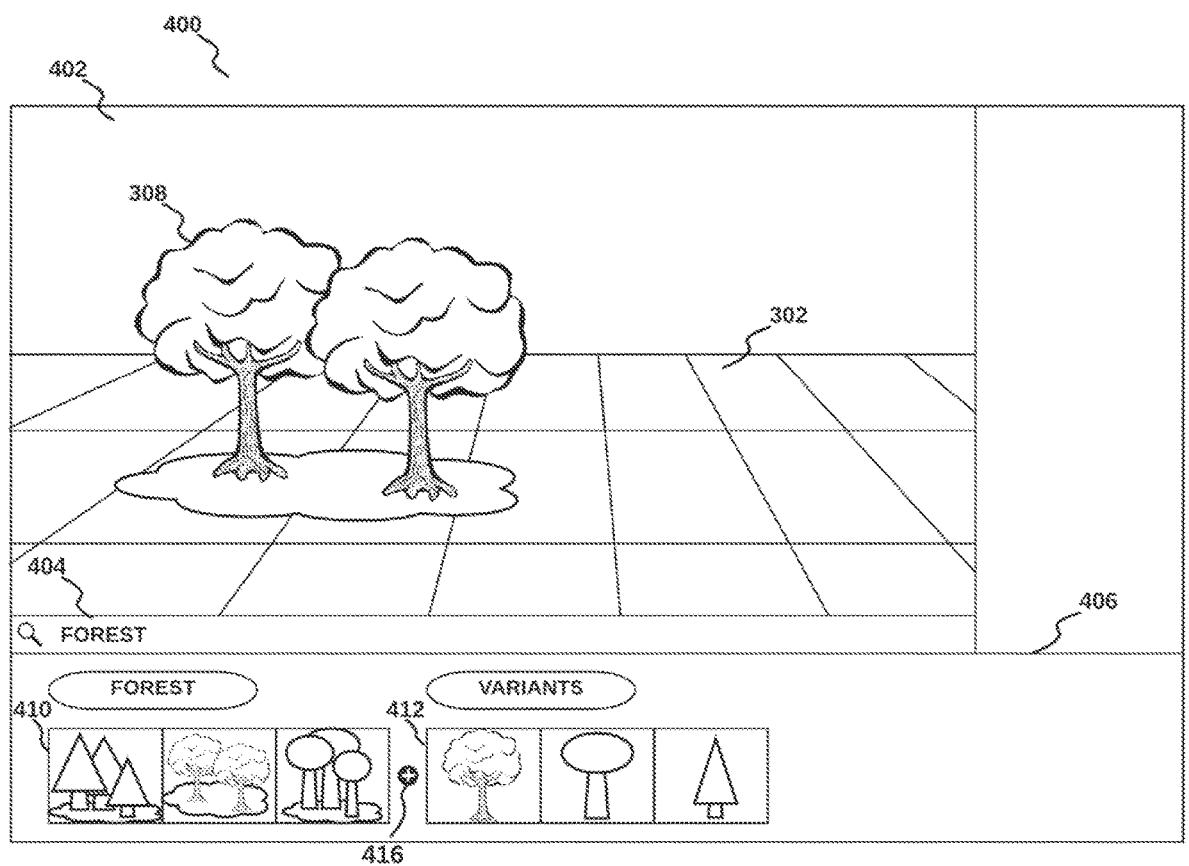
FIG. 6A is a schematic illustrating a graphical user interface displaying digital object suggestions and variants using a camera frustum suggestion system, in accordance with an embodiment.
Figure 6B:
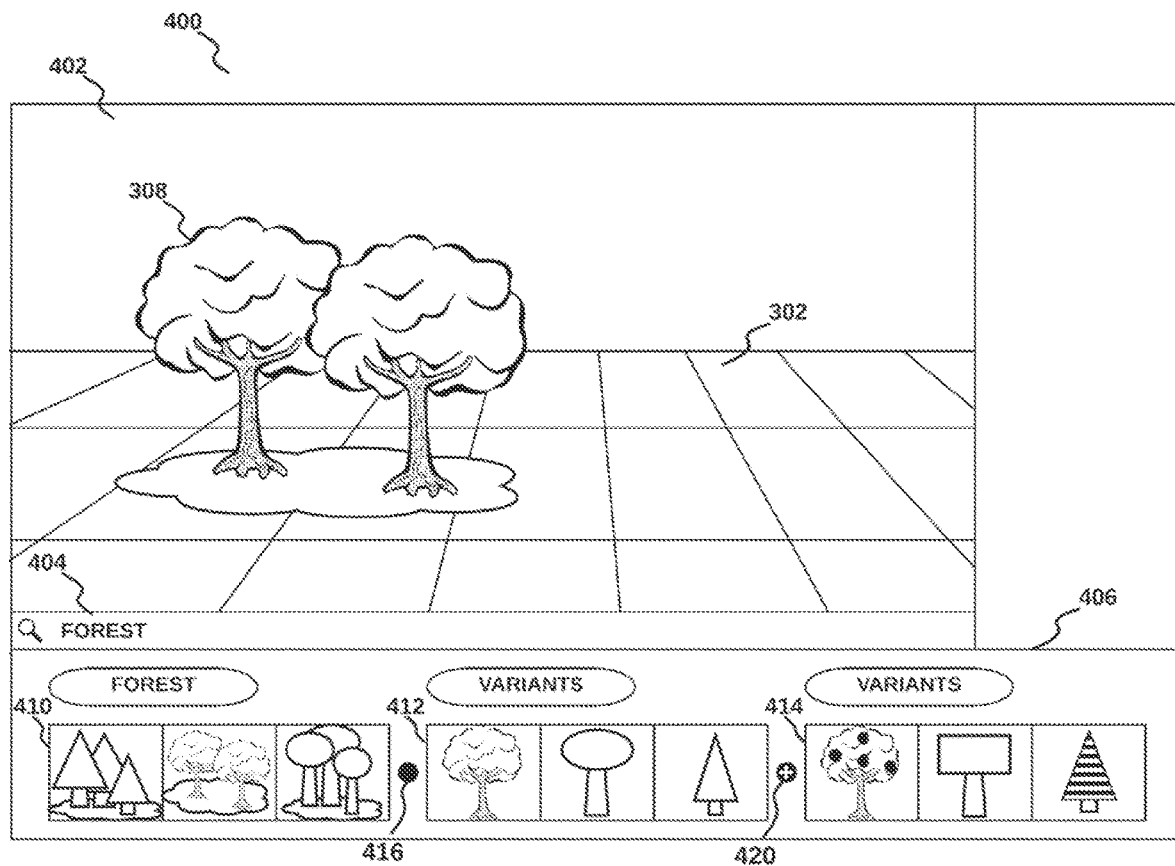
FIG. 6B is a schematic illustrating a graphical user interface displaying digital object suggestions and variants using a camera frustum suggestion system, in accordance with an embodiment.

In accordance with an embodiment, FIG. 6A and FIG. 6B are illustrations of the graphical user interface 400 that include variants created using the method 500 described with respect to FIG. 5. In accordance with an embodiment, FIG. 6A shows an example graphical user interface 400 where a group of three variants 412 is displayed after the addition element 416 is pressed by a user interacting with the graphical user interface 400. In accordance with an embodiment, the addition element 416 may transform into a separator once the group 412 appears on the screen, thus providing a separation between the added group of variants 412 and the first group 410 of suggestions. In accordance with an embodiment, the transformation into a separator may include a visual change as shown in FIG. 6B (e.g., such as losing the '+' symbol in the graphical user interface 400).

In accordance with an embodiment, FIG. 6B shows the example graphical user interface 400 from FIG. 6A wherein an additional group of three variants 414 is displayed after an addition element 420 is pressed by a user interacting with the graphical user interface 400. The additional group of variants 414 include variations of the digital objects in the first group 410 and/or the first group of variants 412. For example, the additional group of three variants 414 may be style variants of the first group of variants 412, including: a tree with apples instead of a tree without apples, a stylized rectangular tree instead of a stylized oval tree and a striped evergreen tree instead of a solid evergreen tree.

Figure 7:
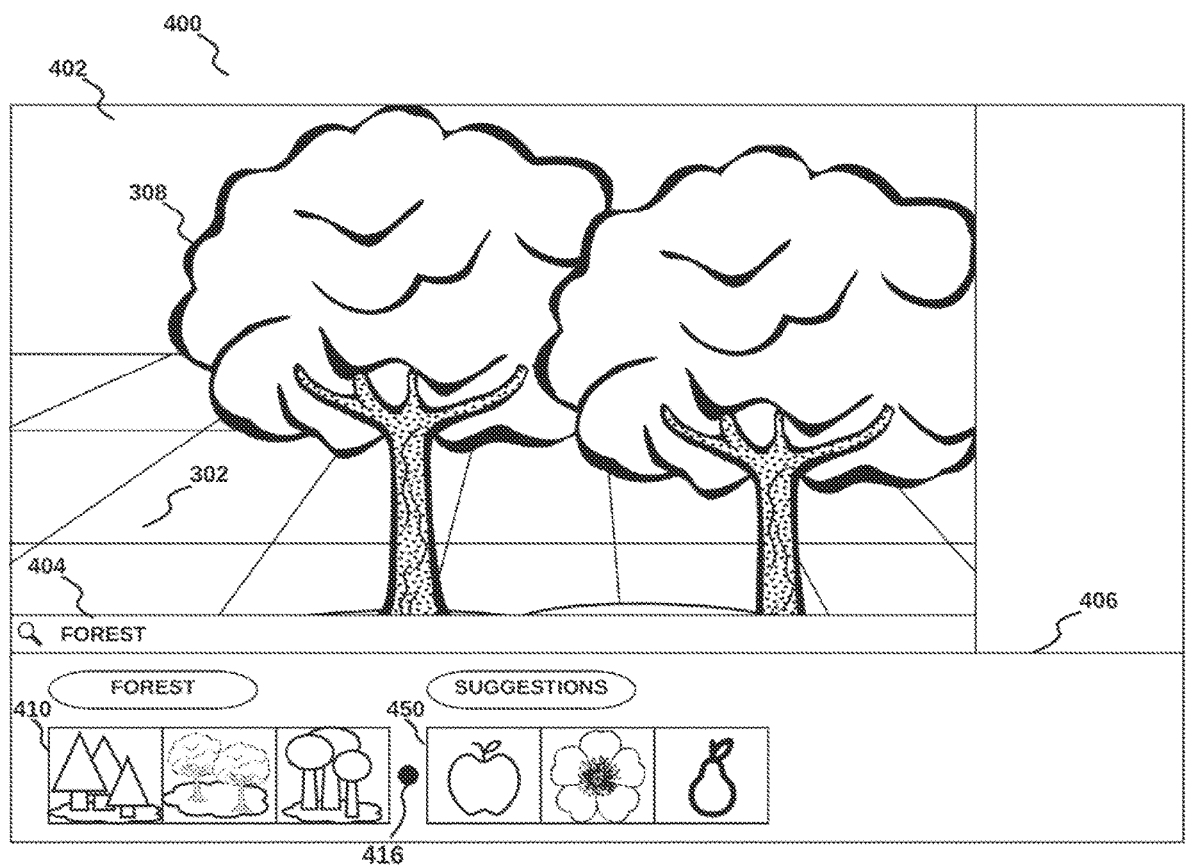
FIG. 7 is a schematic illustrating a graphical user interface displaying digital object suggestions based on contents in a camera frustum using a camera frustum suggestion system, in accordance with an embodiment.

In accordance with an embodiment, FIG. 7 shows the example graphical user interface from FIG. 4 with an additional group of suggestions 450 based on a change of zoom level of the camera view frustum. In accordance with an embodiment, the change in zoom level (e.g., change in scale) may be determined by comparing a size of scene data (e.g., digital objects within the scene data) to a size of frustum volume. In accordance with an embodiment, the change of the zoom level (e.g., the increased zoom shown in FIG. 7 as compared to FIG. 4) is detected by the camera frustum suggestion module 124 at operation 242 of the method 240 (e.g., described with respect to FIG. 2C). Based on the detected change of zoom level, the additional suggestion group 450 is generated (e.g., within operation 246 of the method 240) and displayed in the graphical user interface. In accordance with an embodiment, the additional suggestion group 450 is generated and displayed automatically (e.g., without a request from a user) based on the frustum view changing by a configurable threshold. In accordance with an embodiment, and shown in FIG. 7, the additional suggestion group 450 includes suggested digital objects (e.g., as suggested by operation 246 of the method 240) which are relevant to the contents of the zoomed view (e.g., relevant via traits related to the contents) and relevant to a scale of the contents (e.g., relevant to a relative size of the contents, a zoom level of the displayed view in the view window 402, and the like). The additional suggestion group 450 includes suggested digital objects which may be relevant to the zoomed view. For example, a close up view may cause the camera frustum suggestion module 124 to suggest (e.g., in operation 246) small objects such as fruits which may be relevant in a close up view of the tree patch 308 as shown in FIG. 7. In addition to using scale data for the contents in the view window 402, the close up view may cause the camera frustum suggestion module 124 to suggest (e.g., in operation 246) small objects which are relevant to one or more of the following: traits extracted from text in the search bar 404, traits extracted from initial suggestions 410, and traits extracted from the contents within the frustum view seen in the view window 402. For example, based on the view window 402 showing a close up view of the tree patch 308, the displayed digital objects within the new suggestion group 450 includes items which might be relevant for the close up view, including an apple, a flower, and a pear.

Figure 8:
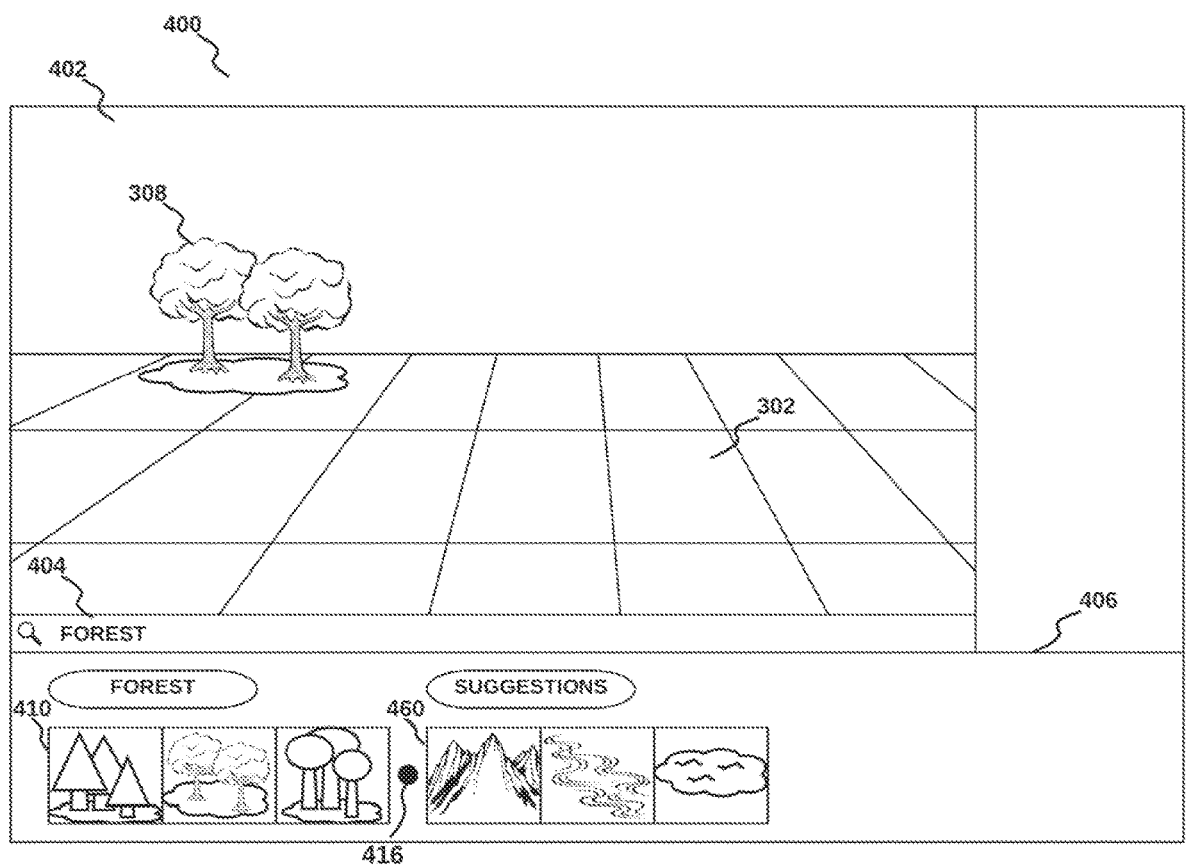
FIG. 8 is a schematic illustrating a graphical user interface displaying digital object suggestions based on contents in a camera frustum using a camera frustum suggestion system, in accordance with an embodiment.

In accordance with an embodiment, FIG. 8 shows another example graphical user interface from FIG. 4 with a second additional group of suggestions 460 based on a change of zoom level of within the view window 402 based on a zooming out of the camera view frustum. In accordance with an embodiment, the change in zoom level (e.g., change in scale) may be determined by comparing a size of scene data (e.g., digital objects within the scene data) to a size of frustum volume. In accordance with an embodiment, the change of the zoom level (e.g., such as the decreased zoom shown in FIG. 8 as compared to FIG. 4) is detected by the camera frustum suggestion module 124 at operation 242 of the method 240 (e.g., described with respect to FIG. 2C). Based on the detected change of zoom level, the second additional suggestion group 460 is generated (e.g., within operation 246 of the method 240) and displayed in the graphical user interface 400. In accordance with an embodiment, the second additional suggestion group 460 is generated and displayed automatically (e.g., without a request from a user) based on the frustum view changing by a configurable threshold (e.g., as determined in operation 242 and 244). In accordance with an embodiment, and shown in FIG. 8, the second additional suggestion group 460 includes suggested digital objects (e.g., as suggested by operation 246 of the method 240) which are relevant to the contents and scale of the contents within the zoomed out view (e.g., relevant to a relative size, a zoom level of the displayed view in the view window 402). The second additional suggestion group 460 includes suggested digital objects which may be relevant to the zoomed out view. For example, a zoomed out view may cause the camera frustum suggestion module 124 to suggest (e.g., in operation 246) large objects such as mountains, rivers, and lakes which may be relevant in a zoomed out view of the tree patch 308. In addition to using scale data for the contents in the view window 402, the zoomed out view may cause the camera frustum suggestion module 124 to suggest (e.g., in operation 246) large objects which are relevant to one or more of the following: traits extracted from text in the search bar 404, traits extracted from initial suggestions 410, and traits extracted from digital objects within the frustum view seen in the view window 402. For example, based on the view window 402 showing a zoomed out view (e.g., a distant view) of the tree patch 308, the displayed digital objects within the second additional suggestion group 460 includes items which might be relevant for the distant view (e.g., and relevant to the suggestion bar input 404 and traits associated with digital objects within the view window 402), including a mountain, a river, and a lake.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 9:
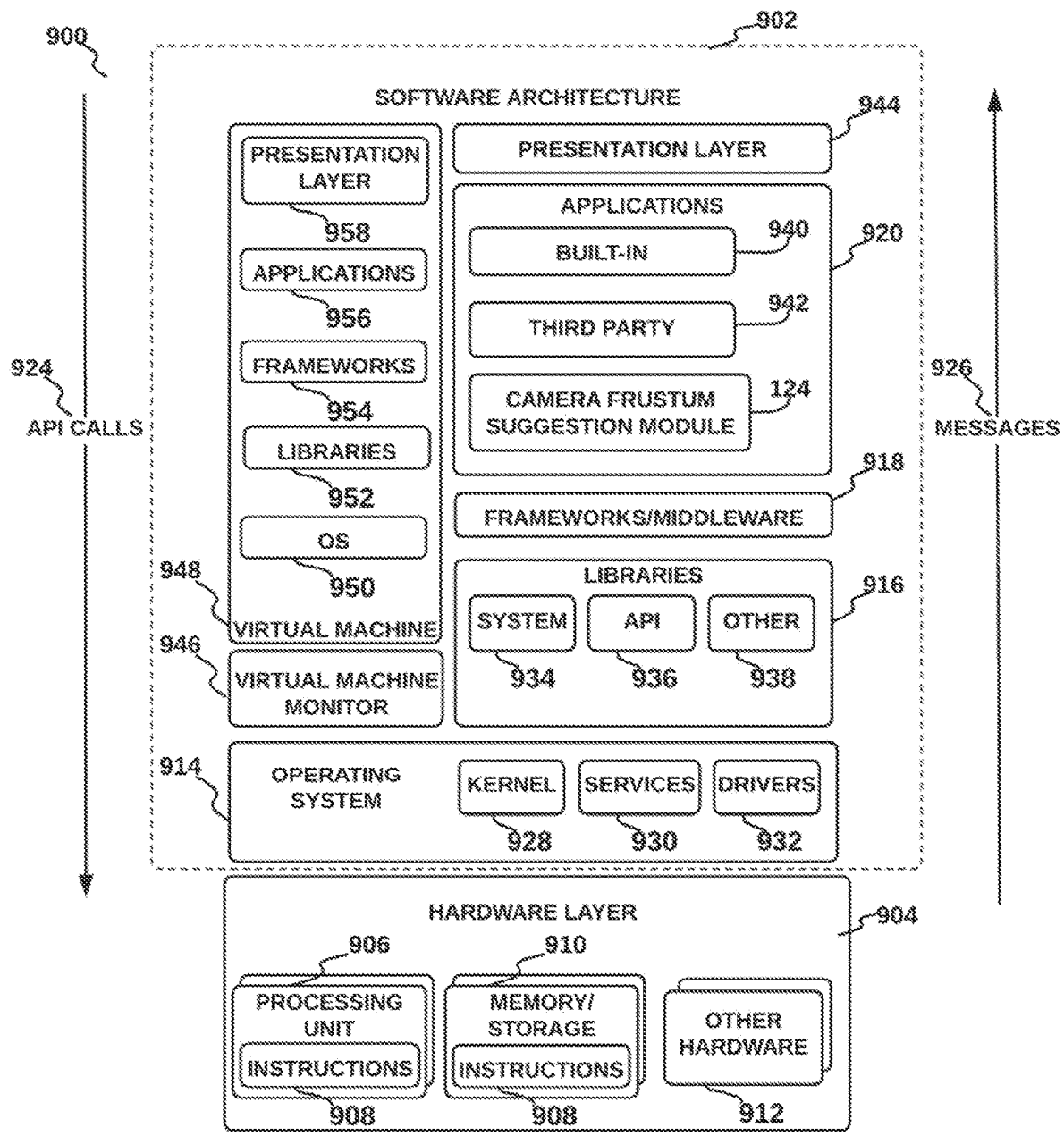
FIG. 9 is a block diagram illustrating an example software architecture, which may be used in conjunction with various hardware architectures described herein.

FIG. 9 is a block diagram 900 illustrating an example software architecture 902, which may be used in conjunction with various hardware architectures herein described to provide a gaming engine 901 and/or components of the camera frustum aware suggestion system 100. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 having associated executable instructions 908. The executable instructions 908 represent the executable instructions of the software architecture 902, including implementation of the methods, modules and so forth described herein. The hardware layer 904 also includes memory/storage 910, which also includes the executable instructions 908. The hardware layer 904 may also comprise other hardware 912.

In the example architecture of FIG. 9, the software architecture 902 may be conceptualized as a stack of layers where each layer provides particular functionality. For example, the software architecture 902 may include layers such as an operating system 914, libraries 916, frameworks or middleware 918, applications 920 and a presentation layer 944. Operationally, the applications 920 and/or other components within the layers may invoke application programming interface (API) calls 924 through the software stack and receive a response as messages 926. The layers illustrated are representative in nature and not all software architectures have all layers. For example, some mobile or special purpose operating systems may not provide the frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be used by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) provide a higher-level common infrastructure that may be used by the applications 920 and/or other software components/modules. For example, the frameworks/middleware 918 may provide various graphic graphical user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 942 may invoke the API calls 924 provided by the mobile operating system such as operating system 914 to facilitate functionality described herein.

The applications 920 may use built-in operating system functions (e.g., kernel 928, services 930 and/or drivers 932), libraries 916, or frameworks/middleware 918 to create graphical user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures use virtual machines. In the example of FIG. 9, this is illustrated by a virtual machine 948. The virtual machine 948 creates a software environment where applications/modules can execute as if they were executing on a hardware machine (such as the machine 1000 of FIG. 10, for example). The virtual machine 948 is hosted by a host operating system (e.g., operating system 914) and typically, although not always, has a virtual machine monitor 946, which manages the operation of the virtual machine 948 as well as the interface with the host operating system (i.e., operating system 914). A software architecture executes within the virtual machine 948 such as an operating system (OS) 950, libraries 952, frameworks 954, applications 956, and/or a presentation layer 958. These layers of software architecture executing within the virtual machine 948 can be the same as corresponding layers previously described or may be different.

Figure 10:
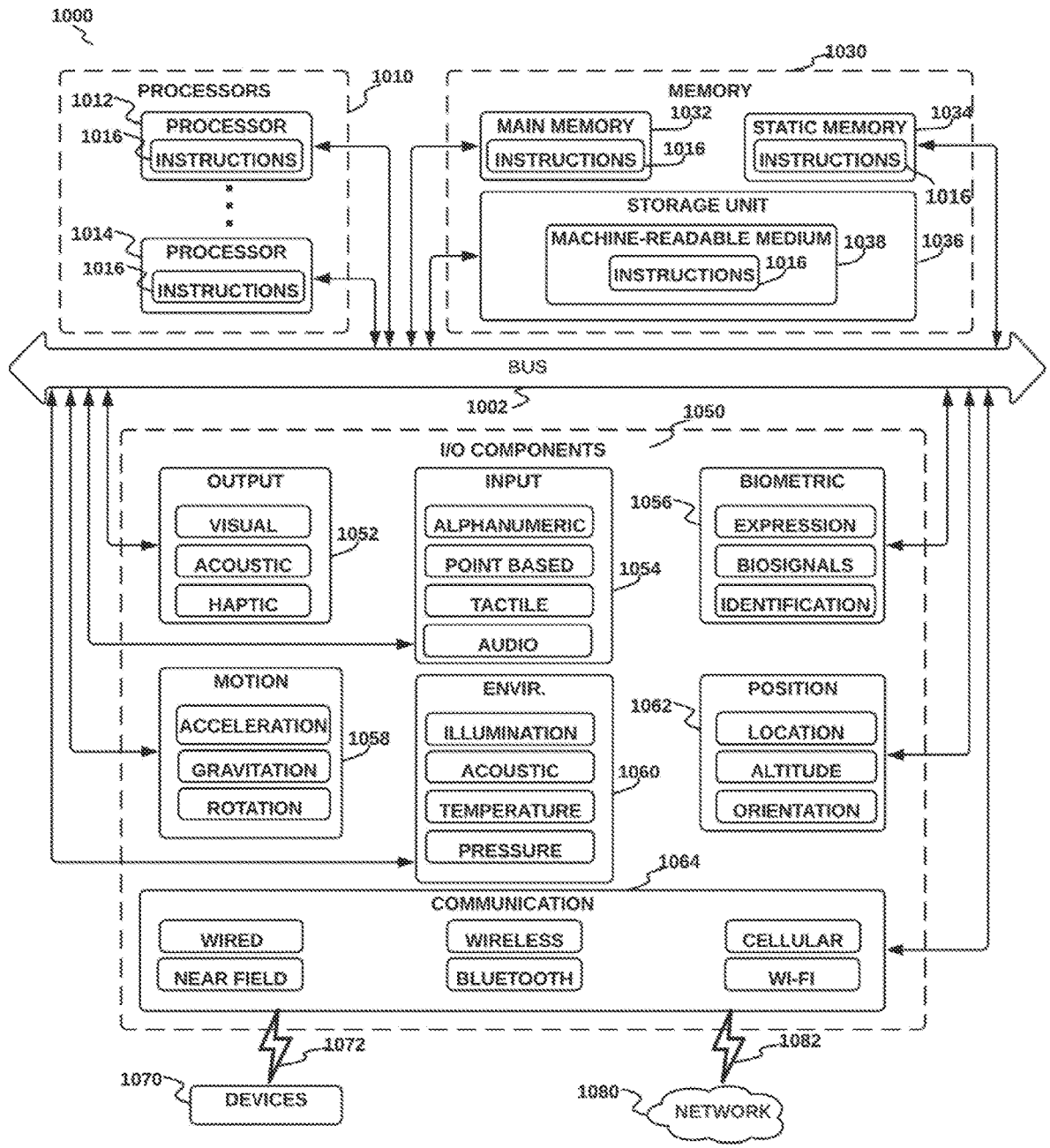
FIG. 10 is a block diagram illustrating components of a machine, according to some example embodiments, configured to read instructions from a machine-readable medium (e.g., a machine-readable storage medium) and perform any one or more of the methodologies discussed herein.

FIG. 10 is a block diagram illustrating components of a machine 1000, according to some example embodiments, configured to read instructions from a machine-readable medium (e.g., a machine-readable storage medium) and perform any one or more of the methodologies discussed herein. In some embodiments, the machine 1000 is similar to the user device 104. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. As such, the instructions 1016 may be used to implement modules or components described herein. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines that individually or jointly execute the instructions 1016 to perform any one or more of the methodologies discussed herein.

The machine 1000 may include processors 1010, memory 1030, and input/output (I/O) components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that may execute the instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 may include a memory, such as a main memory 1032, a static memory 1034, or other memory, and a storage unit 1036, both accessible to the processors 1010 such as via the bus 1002. The storage unit 1036 and memory 1032, 1034 store the instructions 1016 embodying any one or more of the methodologies or functions described herein. The instructions 1016 may also reside, completely or partially, within the memory 1032, 1034, within the storage unit 1036, within at least one of the processors 1010 (e.g., within the processor's cache memory), or any suitable combination thereof, during execution thereof by the machine 1000. Accordingly, the memory 1032, 1034, the storage unit 1036, and the memory of processors 1010 are examples of machine-readable media 1038.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1050 may include a wide variety of components to receive input, provide output, produce output, transmit information, exchange information, capture measurements, and so on. The specific input/output (I/O) components 1050 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1050 may include many other components that are not shown in FIG. 10. The input/output (I/O) components 1050 are grouped according to functionality merely for simplifying the following discussion and the grouping is in no way limiting. In various example embodiments, the input/output (I/O) components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1062, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system compromising:
   one or more computer processors;
   one or more computer memories;
   one or more modules incorporated into the one or more computer memories, the one or more modules configuring the one or more computer processors to perform operations, the operations comprising:
   determining scene data within a frustum volume of a camera within a 3D environment, the scene data including a set of digital objects that are located within the frustum volume;
   determining a set of traits associated with the set of digital objects; and
   determining at least one suggested digital object to add to the set of digital objects based on an amount of a difference between a set of traits associated with the at least one suggested digital object and the set of traits associated with the set of digital objects, wherein the amount of the difference is determined based on an amount of correlation between the set of traits associated with the set of digital objects and the set of traits associated with the at least one suggested digital object, the amount of correlation based on a commonality in a semantic meaning associated with the set of digital objects and a semantic meaning associated with the at least one suggested digital object.

2. The system of claim 1, the operations further comprising receiving additional data from a user interface; and
   wherein the determining of the set of traits of the scene data is further based on the received additional data.

3. The system of claim 1, wherein a trait of the set of traits associated with the scene data comprises a word or a combination of words that can be associated with a concept from which a context is derivable.

4. The system of claim 1, the operations further comprising determining one or more variants for the at least one suggested digital object based on an amount of a difference between the set of traits associated with the at least one suggested digital object and the one or more variants with respect to the set of traits associated with the scene data.

5. The system of claim 1, wherein the operations further include:
   determining a relative size of the set of digital objects within the frustum volume compared to the frustum volume; and
   wherein the determining of the set of traits associated with the scene data is further based on the relative size.

6. The system of claim 1, the operations further comprising:
based on a detecting of a change to the scene data, redetermining the set of traits associated with the scene data based on the change and redetermining the at least one suggested digital object based on the redetermined set of traits.

7. The system of claim 6, wherein the change to the scene data is caused by a change to a position of the camera or a change to an orientation of the camera.

8. The system of claim 6, wherein the change to the scene data is caused by a change to lens properties of the camera.

9. The system of claim 6, wherein the change to the scene data includes an addition of a digital object to the set of digital objects or a removal of a digital object from the set of digital objects.

10. The system of claim 1, further comprising populating the 3D environment with the at least one suggested digital object for subsequent accepting or editing via a user interface.

11. The system of claim 4, further comprising presenting visual representations of the one or more variants in one or more corresponding user interface elements of a user interface for optional selection for including in the 3D environment.

12. The system of claim 11, wherein the presenting of the one or more visual representations of the one or more variants includes grouping the variants into multiple groups based on the amount of the difference.

13. A non-transitory computer-readable storage medium storing a set of instructions that, when executed by one or more computer processors, causes the one or more computer processors to perform operations, the operations compromising:
determining scene data within a frustum volume of a camera within a 3D environment, the scene data including a set of digital objects that are located within the frustum volume;
determining a set of traits associated with the set of digital objects; and
determining at least one suggested digital object to add to the set of digital objects based on an amount of a difference between a set of traits associated with the at least one suggested digital object and the set of traits associated with the set of digital objects, wherein the amount of the difference is determined based on an amount of correlation between the set of traits associated with the set of digital objects and the set of traits associated with the at least one suggested digital object, the amount of correlation based on a commonality in a semantic meaning associated with the set of digital objects and a semantic meaning associated with the at least one suggested digital object.

14. The non-transitory computer-readable storage medium of claim 13, the operations further comprising:
receiving additional data from a user interface; and
wherein the determining of the set of traits of the scene data is further based on the received additional data.

15. The non-transitory computer-readable storage medium of claim 13, wherein a trait of the set of traits associated with the scene data comprises a word or a combination of words that can be associated with a concept from which a context is derivable.

16. The non-transitory computer-readable storage medium of claim 13, the operations further comprising determining one or more variants for the at least one suggested digital object based on an amount of a difference between the set of traits associated with the at least one suggested digital object and the one or more variants with respect to the set of traits associated with the scene data.

17. The non-transitory computer-readable storage medium of claim 13, wherein the operations further include:
determining a relative size of the set of digital objects within the frustum volume compared to the frustum volume; and
wherein the determining of the set of traits associated with the scene data is further based on the relative size.

18. The non-transitory computer-readable storage medium of claim 13, the operations further comprising:
based on a detecting of a change to the scene data, redetermining the set of traits associated with the scene data based on the change and redetermining the at least one suggested digital object based on the redetermined set of traits.

19. The non-transitory computer-readable storage medium of claim 18, wherein the change to the scene data is caused by a change to a position of the camera or a change to an orientation of the camera.

20. A method compromising:
determining scene data within a frustum volume of a camera within a 3D environment, the scene data including a set of digital objects that are located within the frustum volume;
determining a set of traits associated with the set of digital objects; and
determining at least one suggested digital object to add to the set of digital objects based on an amount of a difference between a set of traits associated with the at least one suggested digital object and the set of traits associated with the set of digital objects, wherein the amount of the difference is determined based on an amount of correlation between the set of traits associated with the set of digital objects and the set of traits associated with the at least one suggested digital object, the amount of correlation based on a commonality in a semantic meaning associated with the set of digital objects and a semantic meaning associated with the at least one suggested digital object.

* * * * *